United States Patent
Kirchen et al.

(10) Patent No.: US 10,247,218 B2
(45) Date of Patent: Apr. 2, 2019

(54) BRUSHING RETENTION OF THREADED FASTENER

(71) Applicant: Sikorsky Aircraft Corporation, Stratford, CT (US)

(72) Inventors: Adrial Kirchen, Stamford, CT (US); Richard T. Bourque, Oxford, CT (US); Kristin Elizabeth Mailhot, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 237 days.

(21) Appl. No.: 14/991,087

(22) Filed: Jan. 8, 2016

(65) Prior Publication Data
US 2016/0265577 A1  Sep. 15, 2016

Related U.S. Application Data

(60) Provisional application No. 62/130,798, filed on Mar. 10, 2015.

(51) Int. Cl.
*F16B 19/02* (2006.01)
*F16B 5/02* (2006.01)
*F16B 43/00* (2006.01)

(52) U.S. Cl.
CPC .............. *F16B 19/02* (2013.01); *F16B 5/02* (2013.01); *F16B 2043/008* (2013.01)

(58) Field of Classification Search
CPC .. F16B 5/02; F16B 19/02; F16B 43/00; F16B 13/06; F16B 13/063; F16B 13/065; F16B 13/066; F16B 13/068

USPC .................... 411/69, 546, 531, 55
See application file for complete search history.

(56) References Cited

U.S. PATENT DOCUMENTS

| | | | | |
|---|---|---|---|---|
| 2,139,167 A | * | 12/1938 | Marshall | F16B 13/065 411/55 |
| 2,607,447 A | * | 8/1952 | Tuttle | E04B 1/40 428/116 |
| 2,796,907 A | * | 6/1957 | Dumas | F16B 37/043 411/55 |
| 2,863,351 A | | 12/1958 | Vaughn | |
| 2,971,425 A | | 2/1961 | Blakeley | |
| 3,008,552 A | * | 11/1961 | Cushman | F16B 5/01 16/2.1 |
| 3,373,648 A | * | 3/1968 | Pitzer | F16B 13/066 411/24 |

(Continued)

*Primary Examiner* — Flemming Saether
(74) *Attorney, Agent, or Firm* — Cantor Colburn LLP

(57) ABSTRACT

A fastener assembly includes a first component having a back face and a first mating face opposing the back face, and a second component having a front face and a second mating face opposing the front face. The first component and the second component arranged such that the first mating face is closest to the second mating face. A bushing is installed through the first component, an outer surface of the bushing having frictional engagement with the first component to retain the bushing thereat. A threaded fastener extends through the bushing and the second component, and transmits a load into the bushing. A nut is secured to the fastener at the second component to retain the second component at the first component and which induces the load into the fastener. The frictional engagement between the bushing and the first component is configured to resist the load applied to the fastener.

14 Claims, 2 Drawing Sheets

(56) References Cited

U.S. PATENT DOCUMENTS

| | | | | |
|---|---|---|---|---|
| 3,443,473 A * | 5/1969 | Tritt | F16L 319/10 | |
| | | | 29/523 | |
| 3,813,986 A * | 6/1974 | McVittie | F16B 13/066 | |
| | | | 411/53 | |
| 3,977,146 A * | 8/1976 | Wiley | F16B 5/01 | |
| | | | 16/2.1 | |
| 4,237,768 A | 12/1980 | Volkmann | | |
| 4,481,702 A * | 11/1984 | Mitchell | F16B 13/066 | |
| | | | 29/432 | |
| 5,083,363 A * | 1/1992 | Ransom | B23P 9/025 | |
| | | | 29/272 | |
| 6,068,344 A * | 5/2000 | Nether | B60B 3/145 | |
| | | | 301/35.632 | |
| 8,171,690 B2 | 5/2012 | Ghatikar et al. | | |
| 8,220,222 B2 * | 7/2012 | Ciprian | B64C 1/06 | |
| | | | 244/118.6 | |
| 8,308,247 B2 * | 11/2012 | Kazmierzak | B60B 3/02 | |
| | | | 301/35.632 | |
| 8,322,958 B2 * | 12/2012 | Haylock | F16B 39/01 | |
| | | | 411/339 | |
| 9,212,679 B2 * | 12/2015 | Gmirya | F16B 21/10 | |
| 9,498,855 B2 * | 11/2016 | Gordon | B23P 6/00 | |
| 9,644,669 B2 * | 5/2017 | Griffiths | F16B 43/00 | |
| 9,759,246 B2 * | 9/2017 | Haylock | F16B 5/0258 | |

* cited by examiner

BRUSHING RETENTION OF THREADED FASTENER

CROSS-REFERENCE TO RELATED APPLICATION

This is a non-provisional application that claims the benefit of priority to provisional application No. 62/130,798, which was filed on Mar. 10, 2015. The entire contents of provisional application No. 62/130,798 are incorporated herein by reference.

FEDERAL RESEARCH STATEMENT

This invention was made with government support with the United States Navy under Contract No. N00019-06-C-0081. The government therefore has certain rights in this invention.

BACKGROUND

The subject matter disclosed herein generally relates to fastening of components. More specifically, the present disclosure relates to securing countersunk fasteners in aerospace components.

In typical applications, such as a rotary wing aircraft, or helicopter, many countersunk fasteners are utilized to connect components, due to aerodynamic requirements and/or space constraints. In such installation operations, a conical surface is machined into a parent part, to accommodate the fastener head. This machining operation is often done without direct line of sight access to the location and requires machinist intervention during the machining process, is prone to error and is time consuming and costly.

BRIEF SUMMARY

In one embodiment, a fastener assembly includes a first component having a back face and a first mating face opposing the back face, and a second component having a front face and a second mating face opposing the front face. The first component and the second component arranged such that the first mating face is closest to the second mating face. A bushing is installed through the first component, an outer surface of the bushing having frictional engagement with the first component to retain the bushing thereat. A threaded fastener extends through the bushing and through the second component, and transmits a load into the bushing. A nut is secured to the threaded fastener at the second component to retain the second component at the first component and which induces the load into the threaded fastener. The frictional engagement between the bushing and the first component is configured to resist the load applied to threaded fastener.

Additionally or alternatively, in this or other embodiments the bushing includes a conical bushing surface complimentary to a conical fastener surface at a head of the threaded fastener, to react load applied to.

Additionally or alternatively, in this or other embodiments the bushing is brought into frictional engagement with the first component via a cold expansion process.

Additionally or alternatively, in this or other embodiments the outer surface of the bushing is absent friction reducing or anti-fretting coatings.

Additionally or alternatively, in this or other embodiments the bushing further includes a flange located at the back face.

Additionally or alternatively, in this or other embodiments a washer is located at the second component between the nut and the second component.

Additionally or alternatively, in this or other embodiments the external tensile load is up to a maximum tensile strength of the threaded fastener.

In another embodiment, a method of securing a first component having a first mating surface to a second component having a second mating surface includes inserting a bushing into a first opening in the first component and engaging an outer surface of the bushing into frictional contact with the first component. A threaded fastener is inserted through the bushing and through the second component such that a portion of the threaded fastener is capable of transmitting a load into the bushing. A nut is installed onto the threaded fastener at the second component so as to fasten the first and second components and to induce the load into the threaded fastener. The frictional contact is sufficient to resist tensile loads applied to the bushing via the threaded fastener.

Additionally or alternatively, in this or other embodiments tensile loads applied to the threaded fastener are reacted via a conical bushing surface complimentary to a conical fastener surface at a head of the threaded fastener.

Additionally or alternatively, in this or other embodiments the conical bushing surface is formed in the bushing prior to inserting of the bushing into the first opening.

Additionally or alternatively, in this or other embodiments the bushing is brought into frictional engagement with the first component via a cold expansion process.

Additionally or alternatively, in this or other embodiments the bushing further includes a flange disposed at the back face.

Additionally or alternatively, in this or other embodiments a washer is installed at the second component between the nut and the second component.

Additionally or alternatively, in this or other embodiments the external tensile load is up to a maximum tensile strength of the threaded fastener.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
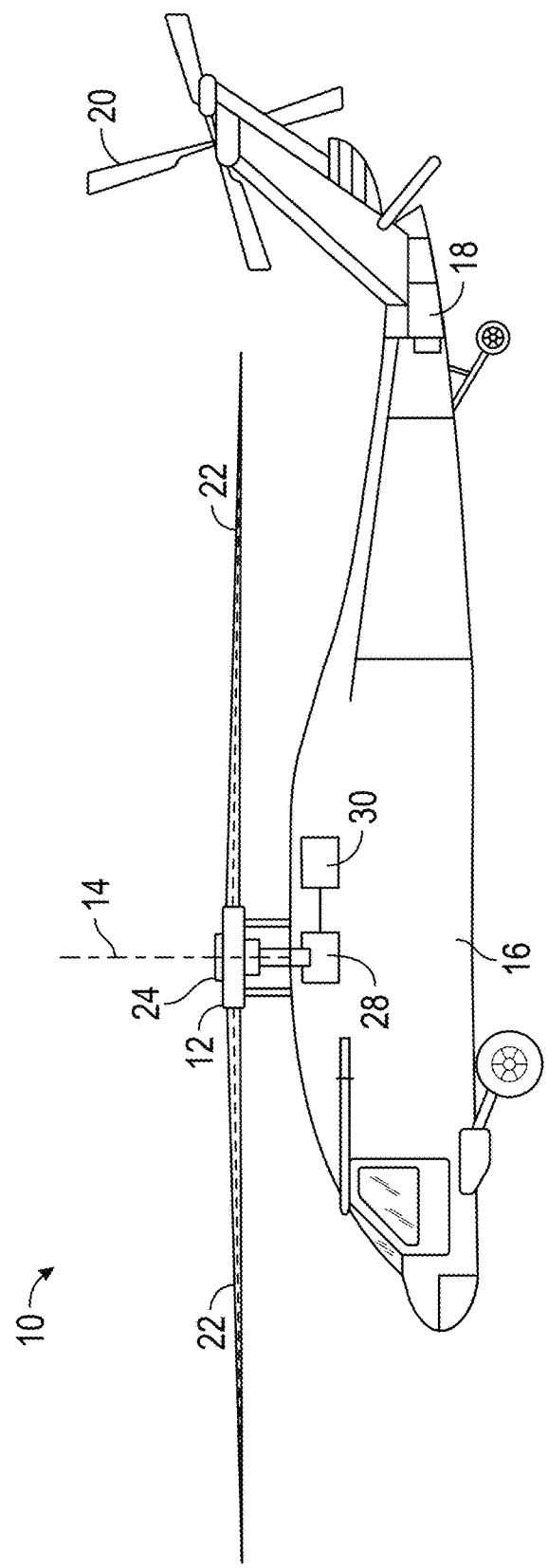
FIG. 1 is a general side view of an exemplary rotary wing aircraft for use in accordance with embodiments.

FIG. 1 illustrates an exemplary rotary-winged aircraft 10 having a main rotor system 12, which rotates about a rotor axis 14. The aircraft 10 includes an airframe 16 which supports the main rotor system 12 as well as an extending tail 18 including a tail rotor 20. The main rotor system 12 includes a plurality of rotor blade assemblies 22 mounted to a rotor hub assembly 24. The main rotor system 12 is driven by a transmission 26. The transmission 26 includes a main gearbox 28 driven by one or more engines, illustrated schematically at 30. The main gearbox 28 and engines 30 are considered as part of the non-rotating frame of the aircraft 10. In the case of a rotary wing aircraft, the main gearbox 28 may be interposed between one or more gas turbine engines 30 and the main rotor system 12. Although a particular rotary wing aircraft configuration is illustrated and described in the disclosed non-limiting embodiment, other configurations and/or machines with rotor systems are within the scope of the present invention. Further, one skilled in the art will readily appreciate that the present disclosure may be utilized in other, non-rotary winged aircraft applications.

Figure 2:
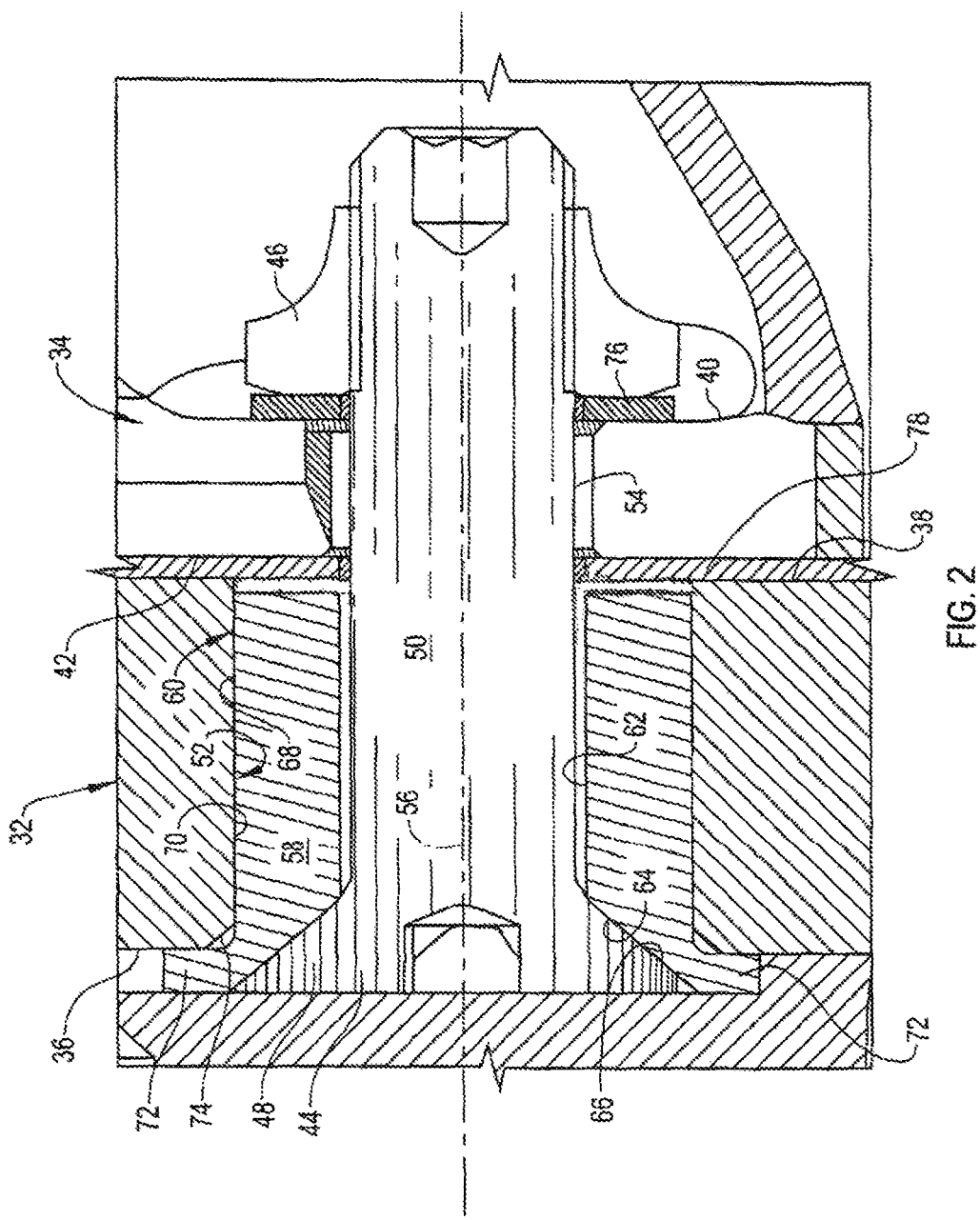
FIG. 2 is a cross-sectional view of an attachment scheme between a first component and a second component.

Referring to FIG. 2, in many locations of the aircraft 10, countersunk fasteners are utilized to secure a first component 32 to a second component 34. In some embodiments, the first component 32 and second component 34 are portions of the main rotor system 12. For example, the first component 32 may be a rotor blade assembly 22 and the second component 34 may be a rotor hub 24.

The first component 32 or base component, has a back face 36 and a first mating face 38 opposite the back face 36, and the second component 34 has a front face 40 and a second mating face 42 opposite the front face 40. The second component 34 is installed to the first component 32 such that the first mating face 38 is closest to the second mating face 42 and in some embodiments abuts the second mating face 42. The first component 32 is secured to the second component 34 via a fastener such as a screw 44 and nut 46 arrangement. The screw 44 is inserted through the first component 32 from the back face 36 through to the first mating face 38 such that a screw head 48 is at the back face 36, with a screw shaft 50 extending through the first screw opening 52 of the first component 32 and a second screw opening 54 of the second component 34. The nut 46 is installed at the front face 40 and threaded onto the screw shaft 50.

The assembly must withstand external tensile loads in accord with a maximum tensile strength of the screw 44, in some embodiments, about 10,000 pounds force along a screw axis 56. To aid in resisting such loads, a bushing 58 is installed into the first screw opening 52, prior to installation of the screw 44. The bushing 58 is, in some embodiments, a tubular sleeve having an outer diameter 60 and an inner diameter 62. The bushing 58 further includes a conical bushing surface 64 complimentary to, and to accommodate a conical screw head surface 66 when the screw is installed into the first component 32 through the bushing 58. The conical bushing surface 64 is formed in the bushing prior to installation by, for example, a bushing manufacturer. Pre forming the conical surface 64 reduces costs and time for the process, and also ensures uniformity and consistency of the conical bushing surface 64. Further, pre-forming conical surface 64 reduces a scrap rate of the first component 32, which in some cases may be a greatly expensive component.

When the bushing 58 is installed, the bushing 58 is cold expanded such that the outer diameter 60 is forced to increase and an outer bushing surface 68 is brought into frictional contact with a first screw opening surface 70. The frictional contact between the outer bushing surface 68 and the first screw opening surface 70 is sufficient to resist the required external loads acting on the screw 44 and nut 46 assembly to hold the connection between the first component 32 and the second component 34. To ensure adequate frictional contact, no anti-fretting or friction reducing coatings are utilized on outer bushing surface 68.

In some embodiments, the bushing 58 further includes a flange 72 located at the back face 36. This flange 72 is not intended to resist the applied external loads, but is an aid in locating the bushing 58 in the first screw opening 52, prior to the cold expansion process. In the shown embodiment, a width of flange 72 is approximately 0% to 20% of the width of the bushing 58, but need not be used in all aspects since the flange 72 need not resist the applied external loads. Further, in some embodiments, a small chamfer 74 may be machined into the first component 32 on the back face 36 at the first screw opening 52 prior to installation of the bushing 58 to make bushing 58 installation easier by providing clearance between the back face 36 and a flange radius of the bushing 58. Further still, in some embodiments, a washer 76 is located between the nut 46 and the front face 40. Additionally, an anti-fretting liner 78 may be positioned between the first component 32 and the second component 34 to prevent frictional wear of the components 32, 34.

In some embodiments, the first component 32 is secured to the second component 34 via the method described below. If the chamfer 74 is desired at the first component, the chamfer 74 is formed at the back face 36 in the first component 32 by a machining tool inserted through the first screw opening 52 from the first mating face 38. Once the chamfer 74 is formed, the machining tool is withdrawn. The bushing 58 is then installed in the first screw opening 52, with the conical bushing surface 64 located at the back face 36 of the first component 32. In some embodiments, such as those where the bushing 58 includes the flange 72, the bushing 58 is inserted into the first screw opening 52 via the back face 36. Once inserted into the first screw opening 52, the bushing 58 is cold expanded to bring the outer bushing surface 68 into frictional contact with the first screw opening surface 70. However, where no flange 72 is used, the bushing 58 can be inserted through the front mating 38 face.

The screw 54 is installed from the back face 36 into the bushing 58 and extends through the second screw opening 54 with the conical bushing surface 64 abutting the conical screw head surface 66. The optional washer 76 and then the nut 46 are installed over the screw 44 at the front face 40, and the nut 46 is tightened to a selected torque.

While the invention has been described in detail in connection with only a limited number of embodiments, it should be readily understood that the invention is not limited to such disclosed embodiments. For instance, while described in terms of aircraft, it is understood that aspects could be used in other contexts such as for wind turbines, maritime propulsion, or other technologies in which a rotating element's plane of rotation will vary from perpendicular with the axis of rotation of a shaft driving the rotating element. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A fastener assembly comprising:
 a first component defining a rotor blade having a back face and a first mating face opposing the back face, and an opening including an inner circumferential surface extending from the back face to the first mating face;

a second component defining a rotor hub having a front face and a second mating face opposing the front face, the rotor blade and the rotor hub arranged such that the first mating face is closest to the second mating face;

a bushing installed through the opening of the rotor blade, an outer circumferential surface of the bushing having a direct frictional engagement with the inner circumferential surface of the opening in the rotor blade to retain the bushing thereat;

a threaded fastener extending through the bushing and through the rotor hub, the threaded fastener transmitting a tensile load into the bushing; and a nut secured to the threaded fastener at the rotor hub to retain the rotor hub at the rotor blade and which induces the load into the threaded fastener, wherein the frictional engagement between the bushing and the rotor blade resists the tensile load applied to the threaded fastener.

2. The fastener assembly according to claim 1, wherein the bushing includes a conical bushing surface complimentary to a conical fastener surface at a head of the threaded fastener, to react to the tensile load applied to the threaded fastener.

3. The fastener assembly according to claim 1, wherein the bushing is brought into frictional engagement with the rotor blade via a cold expansion process.

4. The fastener assembly according to claim 1, wherein the outer surface of the bushing is absent friction reducing or anti-fretting coatings.

5. The fastener assembly according to claim 1, wherein the bushing further includes a flange disposed at the back face.

6. The fastener assembly according to claim 1, further comprising a washer disposed at the rotor hub between the nut and the rotor hub.

7. The fastener assembly according to claim 1, wherein the tensile load is up to a maximum tensile strength of the threaded fastener.

8. A method of securing a first component defining a rotor blade having a first mating surface to a second component defining a rotor hub having a second mating surface, the method comprising:

inserting a bushing into a first opening including an inner circumferential surface extending from a back face to the first mating surface in the rotor blade;

engaging an outer surface of the bushing into direct frictional contact with the inner circumferential surface of the first opening in the rotor blade;

inserting a threaded fastener through the bushing and through the rotor hub such that a portion of the threaded fastener is capable of transmitting a tensile load into the bushing; and installing a nut onto the threaded fastener at the rotor hub so as to fasten the rotor blade and the rotor hub and to induce the tensile load into the threaded fastener, wherein the frictional contact is sufficient to resist tensile loads applied to the bushing via the threaded fastener.

9. The method according to claim 8, further comprising reacting tensile loads applied to the threaded fastener via a conical bushing surface complimentary to a conical fastener surface at a head of the threaded fastener.

10. The method according to claim 9, wherein the conical bushing surface is formed in the bushing prior to inserting of the bushing into the first opening.

11. The method according to claim 8, further comprising bringing the bushing into frictional engagement with the rotor blade via a cold expansion process.

12. The method according to claim 8, wherein the bushing further includes a flange disposed at the back face.

13. The method according to claim 8, further comprising installing a washer at the rotor hub between the nut and the rotor hub.

14. The method according to claim 8, wherein the tensile load is up to a maximum tensile strength of the threaded fastener.

\* \* \* \* \*